United States Patent
Gresch et al.

(10) Patent No.: US 11,221,636 B2
(45) Date of Patent: Jan. 11, 2022

(54) METHOD FOR CONTROLLING A HYDRAULIC TOP LINK OF A THREE-POINT LINKAGE

(71) Applicant: DEERE & COMPANY, Moline, IL (US)

(72) Inventors: Valentin Gresch, Pfäffikon (SZ); Florian Reinmuth, Sinsheim (DE)

(73) Assignee: DEERE & COMPANY, Moline, IL (US)

( * ) Notice: Subject to any disclaimer, the term of this patent is extended or adjusted under 35 U.S.C. 154(b) by 139 days.

(21) Appl. No.: 16/281,753

(22) Filed: Feb. 21, 2019

(65) Prior Publication Data
US 2019/0265737 A1   Aug. 29, 2019

(30) Foreign Application Priority Data
Feb. 28, 2018 (DE) .......................... 102018202990.3

(51) Int. Cl.
| | |
|---|---|
| *A01B 63/00* | (2006.01) |
| *G05D 3/12* | (2006.01) |
| *A01B 59/06* | (2006.01) |
| *A01B 63/111* | (2006.01) |
| *A01B 63/112* | (2006.01) |

(52) U.S. Cl.
CPC ............. *G05D 3/12* (2013.01); *A01B 59/068* (2013.01); *A01B 63/111* (2013.01); *A01B 63/112* (2013.01)

(58) Field of Classification Search
CPC ... A01B 59/068; A01B 63/111; A01B 63/112; G05D 3/12
See application file for complete search history.

(56) References Cited

U.S. PATENT DOCUMENTS

| | | | |
|---|---|---|---|
| 3,825,072 A | | 7/1974 | Collins |
| 6,041,582 A | * | 3/2000 | Tiede .................. A01B 79/005 |
| | | | 56/10.2 A |

(Continued)

FOREIGN PATENT DOCUMENTS

| | | |
|---|---|---|
| DE | 10140383 A1 | 3/2003 |
| DE | 102007017784 A1 | 10/2008 |

(Continued)

OTHER PUBLICATIONS

European Search Report, European Patent Application Ser. No. 19159449.8, European Patent Office, dated Jul. 30, 2019; 9 pages.

(Continued)

*Primary Examiner* — Gary S Hartmann
(74) *Attorney, Agent, or Firm* — Taft Stettinius & Hollister LLP; Stephen F. Rost

(57) ABSTRACT

A method for controlling a hydraulic top link of a three-point linkage on a piece of accessory equipment coupled to a tractor includes providing the top link coupled between a first location on the tractor and a second location on the accessory equipment. The method includes defining an extension position of the top link as a distance between the first location and the second location, where the extension position is adjustable within a predetermined adjustment range. The method further includes determining a force acting on the top link and adjusting the extension position of the top link by a control unit as a function of the force acting on the top link.

19 Claims, 2 Drawing Sheets

(56) References Cited

U.S. PATENT DOCUMENTS

| | | | |
|---|---|---|---|
| 6,218,737 B1 | 4/2001 | Adamek et al. | |
| 10,015,923 B2 * | 7/2018 | Gschwendtner | A01B 63/112 |
| 10,881,043 B2 * | 1/2021 | Bauer | A01B 63/112 |
| 2008/0257570 A1 * | 10/2008 | Keplinger | A01B 63/145 |
| | | | 172/9 |
| 2018/0372490 A1 | 12/2018 | Gresch et al. | |

FOREIGN PATENT DOCUMENTS

| | | |
|---|---|---|
| DE | 102016217944 A1 | 3/2018 |
| DE | 102016220633 A1 | 4/2018 |
| EP | 2016818 A1 | 1/2009 |
| EP | 2230893 A1 | 9/2010 |
| EP | 3485714 A1 | 5/2019 |

OTHER PUBLICATIONS

Online Diskussion zum Thema Hydraulisches Langloch: http://www.trac-technik.de/Forum/showthread.php?tid=17762; Translation: "Online discussion on the hydraulic slotted hole".

* cited by examiner

METHOD FOR CONTROLLING A HYDRAULIC TOP LINK OF A THREE-POINT LINKAGE

RELATED APPLICATIONS

This application claims priority to German Patent Application Ser. No. 102018202990.3, filed Feb. 28, 2018, the disclosure of which is hereby incorporated by reference in its entirety.

FIELD OF THE DISCLOSURE

The present disclosure relates to a method for controlling a hydraulic top link of a three-point linkage.

BACKGROUND

Three-point linkages are widely used in the agricultural sector to attach a piece of accessory equipment to an agricultural tractor. The three-point linkage consists of a top link, which can be adjusted either manually or hydraulically with respect to its extension position, as well as right and left lower links. Both the top link and the two lower links have catch hooks for attaching corresponding coupling elements to the accessory equipment.

Depending on the accessory equipment type, the coupling element assigned to the top link has several superimposed attachment positions, which are typically provided by an upper or lower fixed hole and an intermediate oblong hole. A coupling pin can be inserted through the fixed or oblong hole to which the catch hook of the top link can be attached. The elongated hole is typically used when a plough is mounted, since the elongated hole permits a certain amount of compensation for movement in the event of bumps or the like occurring during field work. In order to ensure a defined (uniform) lifting of the plough at the headland or when using a traction force control realised by raising or lowering the lower links, the extension position of the top link must also be readjusted during ploughing work if necessary so that the coupling pin remains in contact with the agricultural tractor with the end of the oblong hole facing the tractor even if changes occur in the plough's inclination due to the ground contour. However, the latter requires appropriate experience or attention on the part of the operator.

Thus, there is a need to such that the operator is supported in maintaining the correct extension position of the top link.

SUMMARY

In one embodiment of the present disclosure, a method for controlling a hydraulic top link of a three-point linkage specifies that an extension position $l_o$ of the top link articulated to a fixed hole of a piece of accessory equipment within a predetermined adjustment range $l_{o-}, \ldots, l_{o+}$ be adapted as a function of a sensor-acquired tensile or compressive force $F_o$ acting on the top link or of a setpoint value $F_{o,setpoint}$ predetermined for the tensile or compressive force $F_o$, or that the extension position $l_o$ of the top link articulated to an oblong hole or slot of the accessory equipment be adapted as a function of a minimum value $F_{o,min}$ predetermined for the tensile or compressive force $F_o$.

The method takes into account different operating modes in which a ground contour-related adjustment of the extension position $l_o$ of the top link is typically desired or necessary. A distinction is made between operating modes in which the top link is articulated to the oblong hole or slot by means of the coupling pin and those in which it is articulated to one of the fixed holes by repositioning the coupling pin. The extension position $l_o$ is defined by the distance between the two linkage points of the top link, i.e., between a tractor-side attachment point and the coupling pin on the accessory equipment end.

In a first operating mode, the extension position $l_o$ of the top link articulated to the fixed hole of the accessory equipment is adjusted within the specified adjustment range $l_{o-}, \ldots, l_{o+}$ depending on the sensor-acquired tensile or compressive force $F_o$ acting on the top link. This operating mode corresponds to the function of a virtual oblong hole or slot with end stops formed by $l_{o-}$ and $l_{o+}$ limits, where $l_o$ is a function of the longitudinal forces exerted on the top link by the accessory equipment, $l_o=l_o(F_o)$. The direction and extent of the longitudinal forces depend, in particular, on the worked soil contour, i.e., its surface course. Depending on the ground contour, the accessory equipment may be misaligned with the ground and the longitudinal forces acting on the top link may change accordingly. The function $l_o=l_o(F_o)$ is therefore preset in such a way that the accessory equipment is guided along the worked ground contour within the movement limits set by the preset adjustment range $l_{o-}, \ldots, l_{o+}$. To this end, starting from an initial starting position $l_{o,init}$, an extension position $l_o$ suitable for compensating the incorrect position is determined from the sensor-acquired tensile or compressive force $F_o$ and set or adjusted on the top link.

The initial starting position $l_{o,init}$ corresponds to the position of the accessory equipment on level ground intended to achieve an optimum work result. Since the accessory equipment is fixed in motion within the fixed hole with respect to the tractor-side connection made by the top link, there is no need for manual readjustment, as mentioned above in connection with the use of a mechanical oblong hole or slot since this is done automatically in the first operating mode. Accordingly, a defined lifting of the accessory equipment at the headland or when using a traction force control realized by raising or lowering the lower links is also guaranteed. The tensile or compressive forces $F_o$ acting on the hydraulic top link are determined on the basis of a differential pressure measurement between an annular chamber and a piston chamber, taking into account the respective effective piston area. The associated pressure sensors can, for example, be integrated into a locking block of the hydraulic top link.

Alternatively, in a second operating mode, the extension position $l_o$ of the top link articulated on the fixed hole is adjusted within the specified adjustment range $l_{o-}, \ldots, l_{o+}$ depending on a setpoint value $F_{o,setpoint}$ preset for the tensile or compressive force $F_o$. This operating mode also corresponds to the function of a virtual oblong hole or slot, where the $F_{o,setpoint}$ setpoint is specific to the accessory equipment in question and is specified by the manufacturer.

In a third operating mode, the intention is to adjust the extension position $l_o$ of the top link articulated to the oblong hole or slot of the implement as a function of a minimum value $F_{o,min}$ given for the tensile or compressive force $F_o$. To be more precise, this is done in such a way that the tension or compression force $F_o$ is adjusted to the specified minimum value $F_{o,min}$. This ensures that the coupling pin always remains in contact with the end of the oblong hole or slot facing the tractor, even during field work. For example, the minimum value is set by the operator using an user interface on the agricultural tractor.

In all operating modes, the adjustment range $l_{o-}, \ldots, l_{0+}$ can either be fixed depending on the accessory equipment used or can be set by the operator using the user interface of the agricultural tractor.

The adjustment of the extension position $l_o$ is carried out depending on the sensor-acquired tensile or compressive force $F_o$ acting on the top link on the basis of a given characteristic curve. The characteristic curve embodies a function of the shape $l_o=l_o(F_o)$, where this is adapted to the respective accessory equipment item, in particular, to its structural weight distribution in the longitudinal direction. The specific weight distribution for each accessory equipment item has a direct influence on the tensile or compressive forces $F_o$ occurring on the top link due to the ground contour. The appropriate characteristic curve can, for example, be selected on the driver's side using the user interface located in the agricultural tractor from an associated equipment database.

In this process, it is conceivable that the given characteristic curve may be modified as a function of topographical information in order to take account of different soil characteristics. Thus, the tensile or compressive force $F_o$ acting on the top link can be adjusted with regard to possible variations in soil compliance during field cultivation, so that only soil contour-related influences remain. The topographical information is obtained on the basis of a position comparison with georeferenced topographical data, for which purpose it is compared with data relating to the position and orientation of the vehicle combination consisting of agricultural tractor and accessory equipment. The information regarding the position and orientation of the vehicle tandem is provided by a GPS navigation system.

In particular, there is also a possibility that the specified characteristic curve may be modified in the sense of influencing a tractive force exerted on the accessory equipment via the three-point linkage, provided that the topographical information indicates that the accessory equipment is being operated on level ground. In such an event, it is possible to use the hydraulic top link by adjusting the extension position $l_o$ so that part of the tractive effort is transmitted to the driven rear axle of the agricultural tractor via the hydraulic top link, thus optimising its tractive power.

In addition, it may be intended that in the event of an active change in the lifting height set on the three-point linkage, i.e., in the event of intervention of traction force control by changing the lifting position of the right and left lower links of the three-point linkage as well as at the headland or at the beginning of an intended road transport journey, the top link is blocked in its instantaneous extension position $l_o$ or is first moved into a specially provided rest position $l_{o,storage}$.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
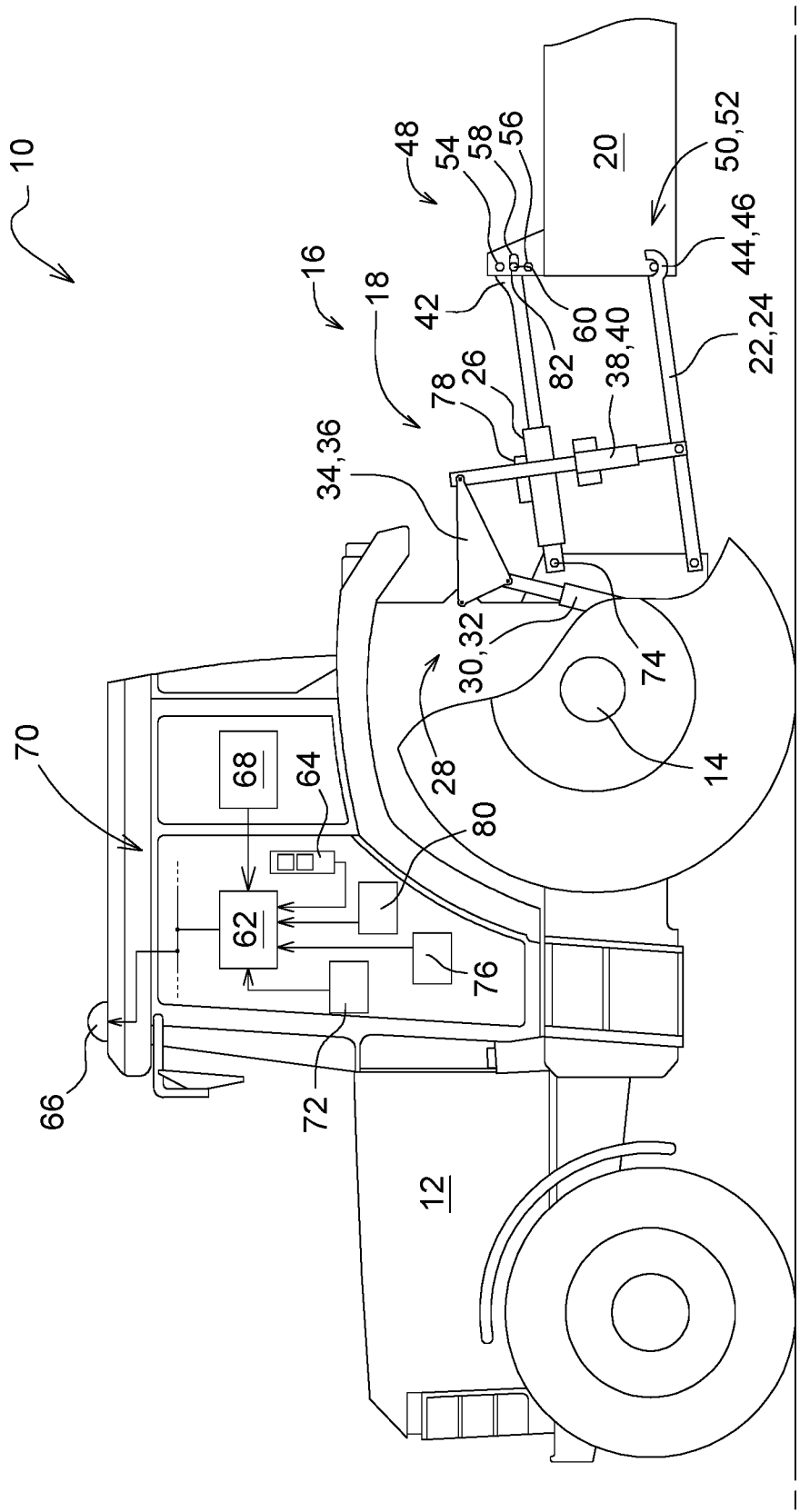
FIG. 1 is a side view of a vehicle within which the method for controlling a hydraulic top link of a three-point linkage is executable.

The vehicle environment or system 10 schematically shown in FIG. 1 is an agricultural tractor 12 with a driven rear axle 14 and a three-point linkage 18 provided in a rear area 16, to which soil engaging accessory equipment 20 is attached such as, for example, a plough, a cultivator or a harrow.

If components of the three-point linkage 18 in pairs are located one behind the other in the visual plane of FIG. 1, only the left component is visible while the right component is concealed by it.

The three-point linkage 18 has a conventional design and left and right lower links 22, 24 as well as a hydraulic top link 26 which can be adjusted with respect to its extension position $l_o$. In addition, there is a lifting gear 28 with hydraulic lifting cylinders 30, 32 for actively changing the lifting height of the three-point linkage 18. To be more precise, the hydraulic lifting cylinders 30, 32 serve to swivel the corresponding lifting arms 34, 36, to which the lower links 22, 24 are attached via the intermediate lifting struts 38, 40. Both the top link 26 and the two lower links 22, 24 have catch hooks 42 or 44, 46 for attaching corresponding coupling elements 48 or 50, 52 to the accessory equipment 20.

The coupling element 48 assigned to the top link 26 comprises several superimposed mounting positions which are given by an upper or lower fixed hole 54, 56 and an intermediate oblong hole or slot 58. A coupling pin 60 can be inserted through the fixed 54, 56 or oblong hole or slot 58 to which the catch hook 42 of the top link 26 is attached.

A microprocessor-controlled control unit 62 is connected to a user interface 64 in the form of a touch-sensitive display unit, a GPS navigation system 66 and an equipment database 68. In this case, the equipment database 68 is part of a control device architecture 70 of the agricultural tractor 12, but it can also be an external central server which the control unit 62 accesses via a wireless data exchange connection (e.g. WLAN). Furthermore, an electric hydraulic control 72 enables the control unit 62 to influence the lifting height of the three-point linkage 18 by correspondingly extending and retracting the lifting cylinders 30, 32 as well as the extension position $l_o$ of the hydraulic top link 26. The extension position $l_o$ is defined by the distance between the two linkage points of the top link 26, i.e., between a tractor-side attachment point 74 and the coupling pin 60 on the accessory equipment end. The lifting height, on the other hand, results from the swivel angle α set on the two lower links 22, 24.

The tensile or compressive forces $F_o$ acting on the hydraulic top link 26 are determined on the basis of a differential pressure measurement between an (non-displayed) annular chamber and a piston chamber, taking into account the respective effective piston area. The associated pressure sensors 76 are integrated into a locking block 78 of the hydraulic top link 26.

A position sensor 80 connected to the control unit 62 is used for the sensory acquisition of an actual value $l_{o,actual}$ of the extension position at the top link 26.

Figure 2:
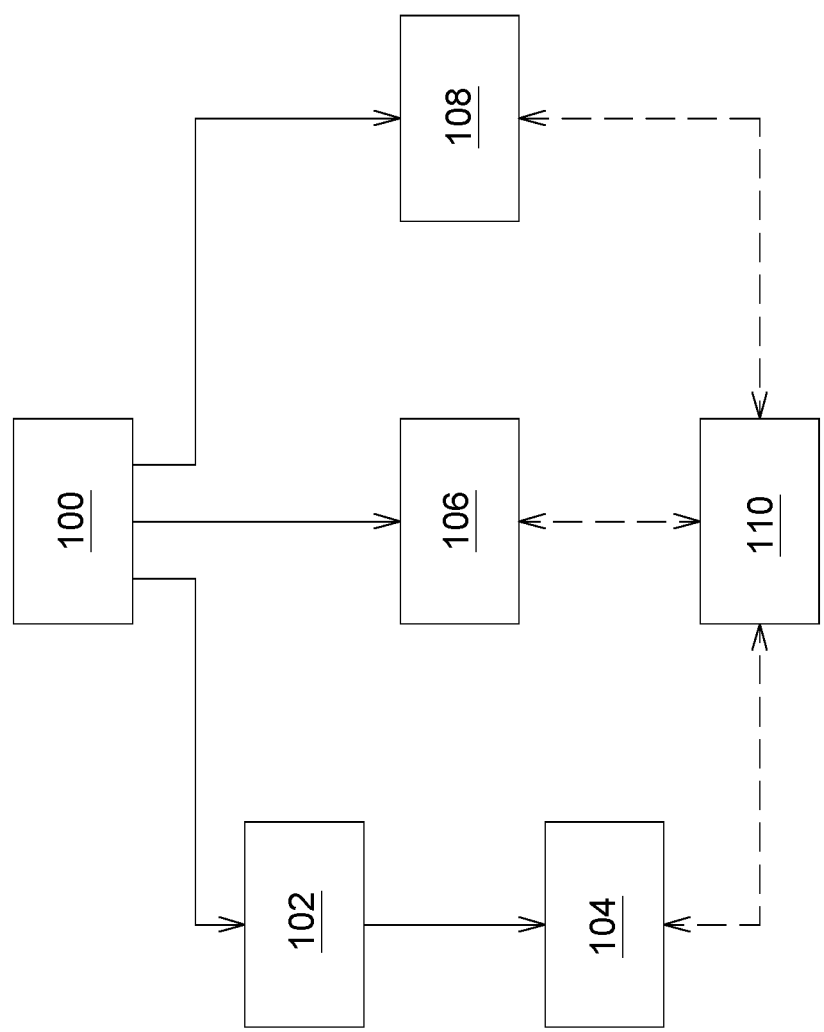
FIG. 2 is a block diagram illustrating the method for controlling a hydraulic top link of a three-point linkage.

FIG. 2 shows a possible execution of the method for controlling the hydraulic top link 26 of the three-point linkage 18. The method takes into account different operating modes in which a ground contour-related adjustment of the extension position $l_o$ of the top link 26 is typically desired or necessary. A distinction is made between operating modes in which the top link 26 is articulated to the oblong hole or slot 58 by means of the coupling pin 60 and those in which the top link 26 is articulated to one of the fixed holes 54, 56 by repositioning the coupling pin 60.

First, the method is started in an initialization step 100 when the agricultural tractor 12 is commissioned or via the user interface 64 on the driver's side. The desired operating mode is then called up or commanded by the driver via the user interface 64. All or only a range of the following operating modes may be available.

I.) Attachment to One of the Fixed Holes

In a first operating mode, the extension position $l_o$ of the top link 26 articulated to the fixed hole 54, 56 is adjusted by the control unit 62 within a specified adjustment range $l_{o-}, \ldots, l_{o+}$ depending on the sensor-acquired tensile or compressive force $F_o$ acting on the top link 26. This operating mode corresponds to the function of a virtual oblong hole or slot with end stops formed by $l_{o-}$ and $l_{o+}$ limits, where $l_o$ is a function of the longitudinal forces exerted on the top link 26 by the accessory equipment 20, $l_o = l_o(F_o)$, which is embodied by a corresponding set characteristic curve. The direction and extent of the longitudinal forces depend, in particular, on the worked soil contour, i.e., its surface course. Depending on the ground contour, the accessory equipment 20 may be misaligned with the ground and the longitudinal forces acting on the top link 26 may change accordingly. The characteristic curve is therefore specified in such a way that the accessory equipment 20 is guided along the worked ground contour in the first operating mode within the movement limits set by the specified adjustment range $l_{o-}, \ldots, l_{o+}$. To this end, in a first process step 102, an extension position $l_o$ suitable for compensating the incorrect position is determined from the control unit 62 from the sensor-detected tensile or compressive force $F_o$ starting from an initial starting position $l_{o,init}$ and, in a second process step 104, the extension position is set or adjusted by actuation of the electric hydraulic control 72 on the top link 26. The initial starting position $l_{o,init}$ corresponds to the position of the accessory equipment on level ground intended to achieve an optimum work result and is preset on the driver's side via the user interface 64, for instance.

The setting or adjustment of the extension position $l_o$ determined in this respect on the top link 26 is carried out by minimizing a control deviation present in the extension position compared with the actual value $l_{o,actual}$ measured by sensors. Alternatively, a variable representing the extension position $l_o$ can be adjusted. This includes, for example, the arrangement angle β of the top link 26 in relation to the tractor-side attachment point 74, because this is clearly related to the respective extension position $l_o$ of the top link 26 when the linkage geometry is known.

In the first process step 102, the control unit 62 adapts the characteristic curve to the respective accessory equipment item 20, in particular to its structural weight distribution in the longitudinal direction. The specific weight distribution for each accessory equipment item 20 has a direct influence on the tensile or compressive forces $F_o$ occurring on the top link 26 due to the ground contour. The relevant characteristic curve can be selected from the equipment database 68 via the user interface 64.

In order to take account of different soil characteristics, the given characteristic curve is additionally modified by the control unit 62 in the first process step 102 depending on topographical information. To be more precise, the tensile or compressive force $F_o$ acting on the top link 26 can be adjusted by the control unit 62 with regard to possible variations in soil compliance during field cultivation, so that only soil contour-related influences remain. The topographical information is obtained by the control unit 62 in the first process step 102 on the basis of a position comparison with georeferenced topographical data, for which purpose it is compared with data relating to the position and orientation of the vehicle combination consisting of agricultural tractor 12 and accessory equipment 20. The information regarding the position and orientation of the vehicle tandem is provided by a GPS navigation system 66 to the control unit 62 in the first process step 102.

Specifically, the characteristic curve is modified by the control unit 62 in the first process step 102 in the sense of influencing a tractive force exerted on the accessory equipment 20 via the three-point linkage 18, provided that the topographical information indicates that the accessory equipment 20 is operated on level ground. The hydraulic top link 26 is then used by setting the extension position $l_o$ in the second process step 104 to transfer part of the drive tractive force via this to the driven rear axle 14 of the agricultural tractor 12 in order to optimize its tractive power in a targeted manner.

In a second operating mode, in a third process step 106, the extension position $l_o$ of the top link 26 articulated to the fixed hole 54, 56 within the predetermined adjustment range $l_{o-}, \ldots, l_{o+}$ is adjusted by the control unit 62 as a function of a set value $F_{o,setpoint}$ predetermined for the tensile or compressive force $F_o$ by actuation of the electric hydraulic control 72. This operating mode also corresponds to the function of a virtual oblong hole or slot 58, where the $F_{o,setpoint}$ setpoint is specific to the accessory equipment 20 in question and is specified by the manufacturer. The relevant accessory equipment 20 is selected from the equipment database 68 via the user interface 64 on the driver side or by means of RFID-supported accessory equipment identification.

II.) Attachment to the Oblong Hole

In a third operating mode, and in a fourth process step 108, the control unit 62 is provided to adjust the extension position $l_o$ of the top link mounted in the oblong hole or slot 58 of the accessory equipment 20 in dependence on a minimum value $F_{o,min}$ predetermined for the tensile or compressive force $F_o$. To be more precise, this is done in such a way that the tension or compression force $F_o$ is adjusted to the specified minimum value $F_{o,min}$. This ensures that the coupling pin 60 always remains in contact with the end 82 of the oblong hole or slot 58 facing the tractor, even during field work. The minimum value $F_{o,min}$ is set by the driver via the user interface 64 of the agricultural tractor 12.

In the above operating modes, the adjustment range $l_{o-}, \ldots, l_{o+}$ is either fixed or selected from the equipment database 68 on the driver's side via the user interface 64 of the agricultural tractor 12, depending on the accessory equipment 20 used.

In addition, in a fifth process step 110 it is intended that, in the event of an active change in the lifting height set on the three-point linkage 18, i.e., in the event of intervention of a traction force control by changing the excavation position of the lower links 22, 24 of the three-point linkage 18 as well as at the headland or at the beginning of an intended road transport journey, the top link 26 is blocked in its current extension position $l_o$ or is moved beforehand into a specially provided rest position $l_{o,storage}$. If this is the case, the respective operating mode is interrupted for the duration of such an intervention and then resumed after confirmation by the operator, if necessary.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A method for controlling a hydraulic top link of a three-point linkage on a piece of accessory equipment coupled to a tractor, comprising:
   providing the top link coupled between a first location on the tractor and a second location on the accessory equipment;
   providing a control unit, at least one sensor, and an electric hydraulic control;
   defining an extension position of the top link as a distance between the first location and the second location, where the extension position is adjustable within a predetermined adjustment range;
   determining a force acting on the top link;
   adjusting the extension position of the top link by the control unit as a function of the force acting on the top link
   determining an initial extension position of the top link as a function of a longitudinal force exerted on the top link by the accessory equipment;
   obtaining topographical information via a global-positioning sensor;
   communicating the topographical information to the control unit; and
   adjusting a driving tractive force exerted on the accessory equipment via the three-point linkage if the control unit determines that the topographical information is indicative of the accessory equipment operating on level ground.

2. The method of claim 1, further comprising:
   detecting a change in a lifting height of the three-point linkage by the control unit; and
   holding the top link in a current extension position of the top link.

3. The method of claim 1, further comprising detecting an initial extension position of the top link by a position sensor and communicating the initial position to the control unit.

4. The method of claim 1, further comprising controlling a lifting height of the three-point linkage by adjusting a lift cylinder and the extension position of the top link.

5. The method of claim 1, further comprising detecting a force acting on the top link with the at least one sensor.

6. The method of claim 1, further comprising performing the adjusting step as a function of a setpoint value predetermined for the force acting on the top link.

7. The method of claim 1, wherein the adjusting step comprises adjusting the top link within a predetermined adjustment range of the top link as a function of a minimum force value predetermined for the force acting on the top link.

8. The method of claim 1, further comprising coupling the top link to an oblong hole on the accessory equipment where the oblong hole comprises a first end and a second end, where a minimum position within the predetermined adjustment range is defined at the first end and a maximum position within the predetermined adjustment range is defined at the second end.

9. The method of claim 8, further comprising operably adjusting the extension position of the top link by the control unit such that the top link is coupled to the first end of the oblong hole.

10. The method of claim 1, further comprising actuating the electric hydraulic control to controllably move the top link from a current extension position of the top link to an adjusted position within the predetermined adjustment range.

11. An agricultural vehicle system, comprising:
   a tractor;
   an accessory equipment coupled to the tractor via a three-point linkage, the accessory equipment configured to perform a work function;
   a top link of the three-point linkage coupled at a first location to the tractor and a second location to the accessory equipment, the top link comprising an adjustable extension length defined between the first location and the second location; and
   a control unit for operably controlling the extension length of the top link within a predetermined adjustment range;
   wherein, the control unit operably adjusts the extension length of the top link within the predetermined adjustment range as a function of a force acting on the top link; and
   wherein the second location comprises a fixed hole and a slot, the top link being coupled to the accessory equipment to either the fixed hole or the slot;
   wherein, the slot comprises a first end and a second end, the first end being disposed nearest the tractor;
   wherein, the control unit operably adjusts the extension length of the top link to maintain the top link in a coupled position within the slot at the first end.

12. A method for controlling a hydraulic top link of a three-point linkage on a piece of accessory equipment coupled to a tractor, comprising:
   providing the top link coupled between a first location on the tractor and a second location on the accessory equipment;
   providing a control unit, at least one sensor, and an electric hydraulic control;
   defining an extension position of the top link as a distance between the first location and the second location, where the extension position is adjustable within a predetermined adjustment range;
   determining a force acting on the top link; and
   adjusting the extension position of the top link by the control unit as a function of the force acting on the top link; and
   determining an initial extension position of the top link as a function of a longitudinal force exerted on the top link by the accessory equipment.

13. The method of claim 12, further comprising:
   detecting a change in a lifting height of the three-point linkage by the control unit; and holding the top link in a current extension position of the top link.

14. The method of claim 12, further comprising detecting an initial extension position of the top link by a position sensor and communicating the initial position to the control unit.

15. The method of claim 12, further comprising controlling a lifting height of the three-point linkage by adjusting a lift cylinder and the extension position of the top link.

16. The method of claim 12, further comprising detecting a force acting on the top link with the at least one sensor.

17. The method of claim 12, further comprising performing the adjusting step as a function of a setpoint value predetermined for the force acting on the top link.

18. The method of claim 12, wherein the adjusting step comprises adjusting the top link within a predetermined adjustment range of the top link as a function of a minimum force value predetermined for the force acting on the top link.

19. The method of claim 12, further comprising actuating the electric hydraulic control to controllably move the top link from a current extension position of the top link to an adjusted position within the predetermined adjustment range.

\* \* \* \* \*